United States Patent [19]

Vollmer

[11] Patent Number: 4,799,837

[45] Date of Patent: Jan. 24, 1989

[54] MULTI-COMPONENT CHUCKING SYSTEM, PARTICULARLY FOR ROTARY MACHINE TOOLS, SUCH AS DRILLS, BORING TOOLS BORING MILLS AND THE LIKE

[75] Inventor: Rolf Vollmer, Tübingen, Fed. Rep. of Germany

[73] Assignee: Montanwerke Walter GmbH, Tubingen, Fed. Rep. of Germany

[21] Appl. No.: 152,913

[22] Filed: Feb. 5, 1988

[30] Foreign Application Priority Data

Apr. 8, 1987 [DE] Fed. Rep. of Germany ....... 3711808

[51] Int. Cl.$^4$ ................................................ B23C 1/00
[52] U.S. Cl. ..................................... 409/232; 279/70; 409/234
[58] Field of Search ........................ 409/232, 233, 234; 408/239 R, 226, 239 A; 279/70, 97, 32, 14, 19.2, 19.3, 75

[56] References Cited

U.S. PATENT DOCUMENTS

| | | | |
|---|---|---|---|
| 3,618,962 | 11/1971 | Cox et al. | 409/232 |
| 3,671,050 | 6/1972 | Anderson et al. | 409/232 |
| 4,176,699 | 12/1979 | Leitner | 279/75 |
| 4,621,960 | 11/1986 | Toellner | 409/232 |
| 4,643,623 | 2/1987 | Kondo et al. | 409/232 |

*Primary Examiner*—Leon Scott, Jr.

*Attorney, Agent, or Firm*—Frishauf, Holtz, Goodman & Woodward

[57] ABSTRACT

A multi-component chucking system, in particular for concentric or true-rotation tools, has a recieving body (1) optionally having a chucking shaft, with an engagement surface (8) extending at right angles to the axis of rotation (2) and a coaxial retention bore (7) as well as a tool element (9), preferably embodied as a tool holder. On its end face, the tool element also has an engagement surface (11) at right angles to the axis of rotation and is formed with a coaxial retention stub (10) fitting into the retention bore (7), by means of which stub the tool element can be centered with respect to the receiving body. A chucking pin (18) associated with the retention stub and coaxial with the axis of rotation, along with chucking means actuatable from outside the receiving body, allows the clamping together of the tool element and the receiving body. The chucking means have two radially movably supported locking elements (27), which have locking surfaces by which, in a chucking position, wedge-like surface regions (21) of the chucking pin (18) that are inclined with respect to the axis of rotation are engaged from below. These wedge-like surface regions of the chucking pin are located on a single common conical surface region that is coaxial with the axis of rotation and forms an acute angle (22) with it.

11 Claims, 3 Drawing Sheets

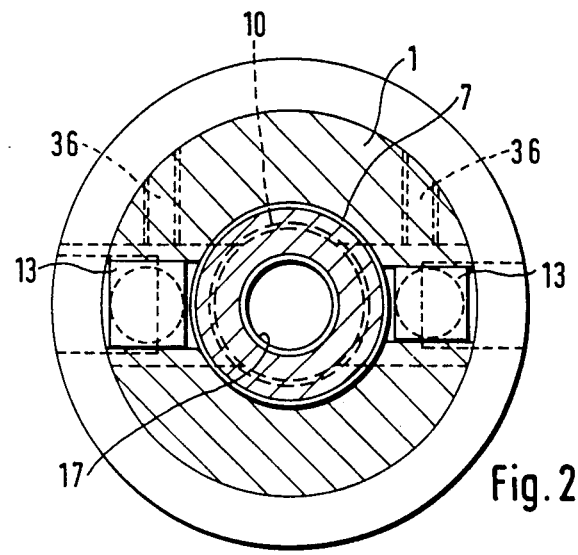
Fig. 2
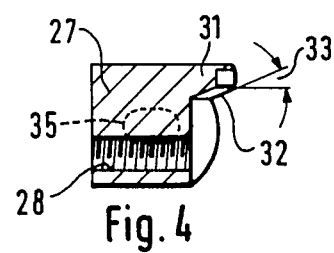
Fig. 3
Fig. 4
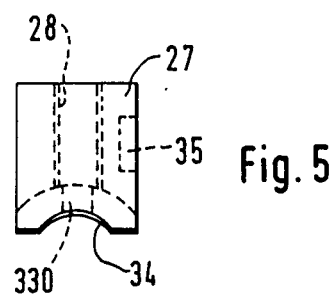
Fig. 5

MULTI-COMPONENT CHUCKING SYSTEM, PARTICULARLY FOR ROTARY MACHINE TOOLS, SUCH AS DRILLS, BORING TOOLS BORING MILLS AND THE LIKE

REFERENCE TO RELATED DISCLOSURE

German Patent Disclosure Document No. DE-OS 33 14 591

German Patent Disclosure Document No. DE-OS 32 37 128

European Patent EP No. 0204 671 A2

The present invention relates a chucking system and more particularly to a chucking system to permit retention of a rotary machine tool bit, such as a boring tool, a drill, a milling cutter or the like on a rotating spindle; and more particularly to an arrangement for rapidly releasing the tool bit, and which is versatile and adaptable to various types of tools.

BACKGROUND

Various types of machine tools have spindles on which chucking elements can be located. The chucking elements, which may also be referred to as tool bit reception elements, are constructed to receive an end shank portion of the tool bit. They should be adaptable to various types of tool bits, while permitting quick release of the tool bits. Of course, they must retain the tool bits in an exactly centered position, so that the rotation of the tool bit will be true, with respect to the axis of rotating on the machine tool. It has been proposed to form the tool bits with a projecting retention stub; or, alternatively, to provide adaptor elements, arranged to be coupled to the tool bits, which then in turn will have this retention stub, and to so contruct the reception body that the retention stub is received therein and retained in position. The retention stub, typically, is located in a hollow space, surrounded by the side walls of the retention body. Clamping elements then are provided on the retention body to clamp the stub, and thereby hold the tool bit in position.

In a chucking system of this kind, known from German Patent Disclosure Document No. DE-OS 33 14 591, the retention bore, there called a reception bore, and the retention stub, acting as a centering pin, are conically embodied. The arrangement is such that the inside cone of the retention bore has a larger cone angle, by a predetermined small angular amount, than the outer cone of the retention stub, and by suitably embodying the retention stub and/or the receiving body, at least one of these two cones is elastically deformable until in the course of the longitudinal displacement of the conical gap between the two cones, the two cones rest against one another over a large surface area. In this chucking system, even if strong forces acting laterally upon the tool element are produced, a high degree of concentricity, or true rotation coaxial with the axis of rotation of the machine tool, is assured without making excessive demands in terms of manufacturing accuracy, and without difficulties in joining the tool element to the receiving body.

The chucking means that clamp the tool element to the receiving body comprise a coaxial clamping screw, which extending through a suitable longitudinal bore of the receiving body is axially supported on a shoulder of the receiving body and is screwed into an associated, coaxial threaded bore in the retention stub of the tool element.

This central clamping screw is accessible only from the backside of the receiving body, which under some circumstances is inconvenient, especially if the receiving body is inserted into a tool spindle by means of a chucking shaft. In a tool change, the receiving body must first be removed from the spindle, in order to make the clamping screw accessible, and to enable loosening the tool element that carries the tool. In practical terms, this means that a plurality of elements must be disassembled, beginning from behind. Even if the receiving body is formed directly by the hollow tool spindle, problems can arise in terms of how simple it is to actuate the central clamping screw with an automatic tool changing device.

The same is true, in principle, for fundamentally similar chucking systems, which have a cylindrical retention stub of the tool element, one of which is described by way of example in German Patent Disclosure Document No. DE-OS 32 37 128.

On the other hand, an actuation of the chucking means from the side of the receiving body permits a chucking system that is the point of departure for the present invention and is described in European Patent No. 0204 671 A2. In this chucking system, a coaxial chucking pin is screwed together with the cylindrical retention stub of the tool element, and on its portion located in the associated hollow space of the receiving body it has two opposed parallel plane surfaces, into which a set of teeth of sawtooth-like profile is cut. The chucking or locking elements, which are in the form of slides and are supported radially displaceably in corresponding guide bushings in the wall of the receiving body, are in turn correspondingly indented on the face ends oriented toward the chucking pin, and the arrangement is such that when the chucking elements are in the chucking position, at least two wedge-shaped faces, located axially succeeding the chucking pin teeth, mesh with corresponding oblique chucking faces spaced axially apart from one another, of the indentation of the chucking elements. The actuating means for adjusting the two diametrically opposed slides are provided by a clamping screw actuatable from the side of the receiving body by means of an Allen head tool, with the chucking screw extending through a corresponding through bore of the chucking pin in the vicinity of the teeth. This clamping screw can also be embodied as a turnbuckle screw or R/L screw, the right-hand and left-hand threaded portions of which are screwed into associated threaded bores of the slides.

Since the clamping screw crosses through the chucking pin, it must be removed entirely when the tool element is removed from the receiving body, that is, when there is to be a tool change; this is inconvenient and is also undesirable because there are loose parts involved; otherwise, the chucking pin must be slotted, which weakens it. Very stringent demands in terms of manufacturing precision must also be made, if it must be assured that with indentations meshing with one another, a plurality of teeth or tooth faces located axially spaced apart from one another must bear the same amount of weight. Even relatively slight inaccuracies in manufacture mean that the transmission of force takes place to locally limited portions of the surface area, which are then correspondingly overloaded. To avoid the situation in which either the teeth do not properly mesh with one another or the couplers that couple the tool element to the receiving body in a manner fixed against relative rotation will seize, the chucking pin must in practice therefore have a certain rotational mobility relative to the retention stub; this is attained, for example, by screwing the chucking pin onto the retention stub. In that case, first, a one-piece embodiment of the chucking pin on the retention stub, which would be desirable for some applications, would be impossible, while on the other hand even a slight rotation of the chucking pin with respect to the retention stub during the chucking operation, because of the threading, will lead to a not insignificant, undefined amount of axial motion of the chucking pin that also results in a non-uniform distribution of the tensile force to be transmitted to the axially successively located tooth faces of the teeth that come to mesh with one another.

The Invention

It is an object to provide a multi-component chucking system which one the one hand maintains a high degree of true rotation or concentricity even if major forces acting laterally upon the tool element arise, and on the other hand while having a simple structure assures an exact axial clamping of the tool element against the receiving body with a strong axial clamping force, the clamping being independent of the angular position of the tool element dictated by the coupler elements, and in particular without requiring the disassembly of the tool element from the machine spindle.

Briefly, the tool bit has formed thereon, or attached thereto by an adaptor, a retention stub which is formed with conical surface regions, all of which are concentric with the axis of rotation of the tool bit, and which form an acute cone angle with the axis of rotation of the tool bit. The retention stub is locked into the receiver body by locking elements which are radially movably retained in the receiver body, accessible from the outside and moved towards and away from each other, for example by a turnbuckle-type screw. The locking elements are formed with conical surfaces for engagement with the conical surface regions of the retention stub.

By screwing the locking elements into and out of the receiver, the retention stub, and hence the tool bit, can be easily released or clamped in position as desired, with excellent accuracy and holding force, while being highly resistant to wobble, or departure from coaxial true rotation of the tool bit in use.

DRAWINGS

FIG. 1, in a side view, shows a fragmentary axial section of a chucking system according to the invention;

FIG. 2 is a top view of the chucking system of FIG. 1, in a section taken along the line II—II of FIG. 1;

FIGS. 3-5 are an end view, a side view in axial section and a top view, respectively, of a chucking element of the chucking system of FIG. 1.

DETAILED DESCRIPTION

Figure 1:
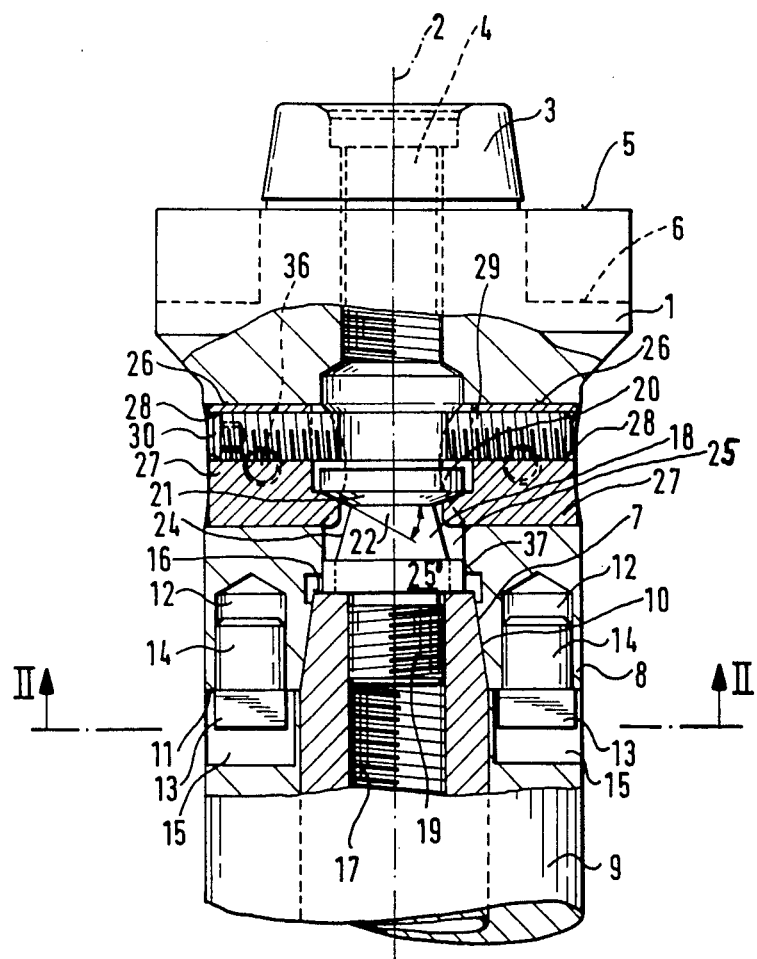
Figure 6:
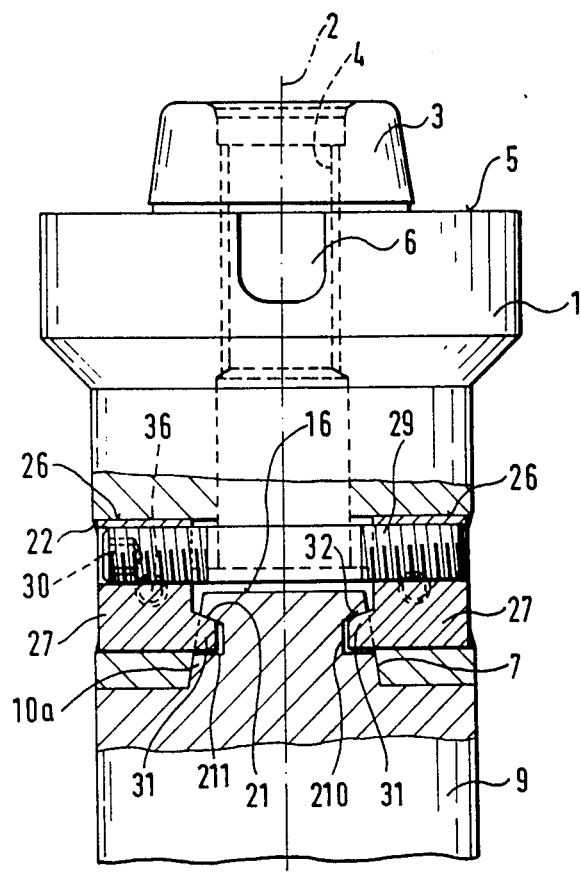
FIG. 6, in a sectional view corresponding to FIG. 1, shows a modified embodiment of a chucking system according to the invention.

In both versions, that is, the embodiments of FIGS. 1 and 6, the chucking system has a substantially cylindrical, solid receiving body 1 having an NCT cone 3 coaxial to the axis of rotation 1 and having a coaxial threaded bore 4, which leads from the face end of the NCT cone 3 into the receiving body 1. The NCT cone 3, which is adjoined by a plane surface 5 extending at right angles to the axis of rotation, provides true concentric coupling of the receiving body 1 to a tool spindle, not otherwise shown. Coupler elements associated with the tool spindle engage recesses 6 of the tool body 1, which are open at the edge. The axial clamping can be effected via a central clamping screw screwed into the threaded bore 3.

On the side opposite the plane surface 5, a coaxial conical retention bore 7 is formed in the receiving body 1, beginning at a plane engagement surface 8 extending at right angles to the axis of rotation 2.

A substantially cylindrical tool element 9 which supports a true or concentrically rotating tool, such as a milling knife head, is clamped to the receiving body 1. The tool element 9 has a coaxial conical retention stub 10 (FIG. 1) or 10a (FIG. 6) on its face end, the retention stub being surrounded by a plane engagement surface 11 extending at right angles to the axis of rotation 2. The inside cone of the retention bore 7 has a cone angle that is greater, by a predetermined small angular amount, than the outside cone of the retention stub 10, 10a. The arrangement is such that upon the longitudinal displacement of the conical gap between the two cones, at least one of these two cones is elastically deformable until the two cones rest against one another over a large surface area.

In the vicinity of the engagement surface 8, coupler elements 13 (FIG. 1) having a cylindrical shank 14 are pressed into corresponding axially parallel cylindrical bores 12, engaging corresponding recesses 15, which are open at the edges, in the vicinity of the engagement surface 11 of the tool element 9, and establish a play-free coupling, fixed against relative rotation, between the tool element 9 and the receiving body 1. These coupler elements 13 are not shown in FIG. 6.

In the embodiment of FIG. 1, the tool element 9 has a coaxial threaded bore in the vicinity of the retention stub 10, beginning at the plane end face 16 of this retention stub. A coaxial mushroom-shaped chucking pin 18 is mounted without play upon the end face 16, being embodied as a rotationally symmetrical rotating part and having a coaxial threaded extension 19 that is screwed into the threaded bore 17.

Alternatively, the chucking pin 18 could also be integrally formed onto the retention stub 10, in which case the threaded extension 19 would be dispensed with.

The mushroom-shaped chucking pin 18 has, adjacent to its upper flat end face, a first cylindrical portion 20, which on the end opposite the end face is defined by an annularly encompassing coaxial conical surface region 21 that forms a wedge surface. The conical surface region 21 forms an acute angle 22 with the axis of rotation 2; this face 21 is adjoined by a frustoconical coaxial portion 24, which finally is followed by a second coaxial cylindrical portion 25', which is seated tightly, with its end face extending at right angles to the axis of rotation 2, on the end face 16 of the retention stub 10.

In the receiving body 1 in the embodiment of FIG. 1, a coaxial, substantially cylindrical hollow space 25 is formed adjacent the conical retention stub 7; in the assembled state, this hollow space 25 receives the chucking pin 18. Two cylindrical guide bores 26 located in the wall portions of the receiving body 1 surrounding the hollow space 25, which guide bores are coaxial to one another, lead into the hollow space 25; their common axis extends at right angles to the axis of rotation 2 and intersects it. Two locking elements in the form of cylindrical slides 27 are longitudinally displaceably supported in the two guide bores 26, each slide having a continuous threaded bore 28. A turnbuckle-type screw, or right-hand/left-hand thread (R/L) screw 29 is screwed into the two threaded bores and crosses through the hollow space 25 in the region above the chucking pin 18 and one end has an actuating device, in the form of an Allen head or some other internal profile 30. As is thus apparent, the R/L screw 29 is actuatable from outside, or more precisely from the side of the receiving body 1.

As FIGS. 3–5 show in particular, each of the slides 27 is formed on its end protruding into the hollow space 25 with a protruding chucking projection 31, which on its side oriented upward in FIG. 1 has a substantially conical locking surface 32. The locking surface 32 forms an acute angle 33 of approximately 20° with a longitudinal axis of the slide 27. The locking surface 32 is interrupted by a groove-like depression 330, in such a manner that two identically shaped locking surface regions are produced on either side of the groove-like depression 330. On its face end oriented toward the chucking pin 18, the chucking projection 31 is recessed in the form of an arc as seen at 34 (FIG. 5), following the outline of the chucking pin 18, such that it surrounds the chucking pin 18 on the conical surface region 21 over an angular zone (sector) of almost 180°. One set screw 36, retaining the slide 27 in captive fashion, engages each of longitudinal grooves 35 provided laterally, one on each slide 27.

Operation - Tightening of the Tool Element 9

With the slides 27 in a retracted inoperative position, the tool element 9 is tightened on the receiving body 1 by fitting the retention stub 10 into the retention bore 7 of the receiving body 1 so as to cause the coupler elements 13, which have a rectangular cross section, to engage the recesses 15. Next the R/L screw 29 is tightened, which moves the two slides 27 radially toward one another. In this process the two portions of the inclined locking surface 32 engage the inclined wedge-like or conical surface region 21 of the chucking pin 18 from below, in the manner shown in FIG. 1. Because of this oblique position of the surfaces 21, 32, a major axially operative clamping force component is transmitted to the chucking pin 18 via the chucking projections 31 and the slides 27, and this force component tends to pull the retention stub 10 into the retention bore 7. The radial clamping force components of the two slides 27, which are precisely 180° from one another, cancel one another out. The magnitude of the axial component of the clamping force brought to bear on the chucking pin 18 depends on the selection of the angle 22, 33, which can be selected as desired.

The chucking pin 18 is longitudinally guided with its second cylindrical portion 25' as seen at 37 (FIG. 1) on the inside wall of the cylindrical hollow space 25.

The locking surface 32 of the slides 27 can also be divided into more than two locking surface regions, and it is also possible to provide a plurality of separate chucking projections 31 on each of the slides 27. The slides 27 themselves are in the form of cylindrical bolts, in the exemplary embodiment described; alternatively, they may also have a polygonal cross section. In special cases, a plurality of radially movable chucking elements may engage the chucking pin 18, but in that case the chucking elements would have to be located opposite one another in such a way as not to produce any unilateral radial chucking force component engaging the chucking pin 18.

With the chucking pin 18 unscrewed, the tool element 9 is a receiving body 1 equipped with a longitudinal bore corresponding to the threaded bore 4 can also be clamped by means of the conventional central clamping screw; this makes the tool element 9 universally usable. The axial clamping forces in each case assure a play-free mutual engagement of the engagement surfaces 8, 11 and a radial centering of the tool element 9 with respect to the receiving body 1 via the retention stub 10 acting as a centering pin.

Embodiment of FIG. 6

This embodiment is similar to that of FIGS. 1–5. Identical or equivalent elements are therefore provided with identical reference numerals and need not be described again here.

Differing from the embodiment of FIGS. 1–5, the retention stub 10a is itself embodied directly as a chucking pin, so that a mushroom-shaped chucking pin 18 mounted upon the end face 16 of the retention stub 10a is dispensed with. To this end, the frustoconical retention stub 10a is provided in the vicinity of the retention bore 7 with an annularly encompassing groove 210, the bottom 211 of which is located in a plane extending at right angles to the axis of rotation 2 and which on the opposite side is unilaterally defined by the conical surface region 21. The groove 210 has a height in the axial direction, and a depth, such that in the chucking state shown in FIG. 6, when the chucking projections 31 of the two cylindrical slides 27 engage the groove 210, they engage the conical surface region 21 solely with their locking surfaces 32, without hindrance from other portions of the groove wall, and transmit the axial forces required for the clamping.

In this case, the hollow space 25 (see FIG. 1) is formed directly by the retention bore 7. The chucking projections 31 are embodied as seen at FIG. 4 in such a manner that they each encompass the "chucking pin" formed by the retention stub 10a in the vicinity of the base of the groove 210 over an angle of almost 180°.

The retention stub itself may have any desired shape suitable for an intended use; it may be cylindrical or conical or in the form of a polygonal profile, to mention only the most important shapes conventional in practice. The chucking elements facing one another, in cooperation with the smooth single conical surface region surrounding the axis of rotation, assures that unilateral resultant radial tension forces will not be exerted upon the chucking pin, so that there is not danger that the retention stub will be unilaterally forced radially out of its position required for exact true concentricity. At the same time, the chucking elements engaging the conical surface region of the chucking pin make it possible to attain a virtually arbitrarily great axial clamping force.

The chucking system is outstandingly suitable for numerical control machine tools having automatic tool changing. In a tool change of this kind, only the tool element carrying the tool needs to be removed; there is no necessity for disassembling other elements, such as the receiving body, from the receiving spindle.

The chucking pin mounted upon the retention stub can be mushroom-shaped, in a preferred embodiment as a rotationally symmetrical rotary part. It is screwed onto the retention stub, the receiving body can also have a coaxial bore for receiving a central clamping screw, which makes it possible selectively to clamp tool elements to the chucking pin or to the known coaxial threaded bore for the central clamping screw, in one and the same receiving body. Conversely, with a suitable selection of the thread with which the chucking pin is screwed onto the retention stub, the tool element, after the chucking pin is removed, can be clamped in a conventional receiving body by means of the central clamping screw.

The clamping elements can advantageously be in the form of slides radially displaceably supported in corresponding guides of the wall of the receiving body; it has been found favorable for each slide to have at least one protruding chucking projection, which carries the locking surface, on its end face. This chucking projection can be shaped to match the outline of the chucking pin, in the vicinity of the face end of the chucking projection, making it possible for the conical surface region of the chucking pin to be encompassed by the chucking projection over an angle of almost 180°. This produces highly favorable conditions in terms of the pressure per unit of surface area.

It is suitable for the actuating means, similarly to what is disclosed in European Patent No. 0204 671 A2, to have an R/L screw cooperating with corresponding threaded bores of the diametrically opposed slides and carrying actuating devices that are accessible from outside. In a preferred embodiment, however, the arrangement is such that the R/L screw extends above the chucking pin, so that the chucking pin itself has neither a bore nor a slit for receiving the R/L screw and accordingly does not undergo any weakening that would impair its stability.

Finally, it may be advantageous for the chucking pin to be guided laterally in the receiving body. This precludes an unfavorable effect on the retention pin by the clamping forces engaging the conical surface region of the chucking pin, even if manufacturing tolerances lend these clamping forces a resultant component at right angles to the axis of rotation.

Various changes and modifications may be made, and features described in connection with any one of the embodiments may be used with any of the others, within the scope of the inventive concept.

I claim:

1. Multi-component chucking system, particularly for rotary tool elements (9) having
   a coupling means (10, 10a, 18) secured to the tool element and including an axially extending retention stub (18, 10a),
   a receiver body (1) adapted to rotate about an axis of rotation (2), said receiver body having a first end adapted for connection to a machine tool and a second end adapted to receive the coupling element means of the tool element,
   said receiver body being formed with a tool element engagement surface (8) and a tool element receiving recess (7), for retaining the tool element on the body in an axially centered position;
   locking means (27) engageable with the coupling element means (10, 10a, 18) for locking the tool element (9) on the receiver body (1): and
   wherein in accordance with the invention
   the retention stub (18, 10a) is formed with conical surface regions (21) all of which regions are concentric with the axis of rotation (2) and form an acute cone angle with the axis of rotation; and
   said locking means include locking elements (27) radially movably retained in said receiver body (1), accessible from the outside of said receiver body, formed with conical locking surfaces thereon for engagement of the conical locking surfaces with said conical surface regions; and
   moving means (29) engageable with said locking element (27) for moving and selectively locking said locking elements and retaining said locking elements in position in the body and engaging said conical locking surfaces with said conical surface regions, or releasing said retention stub from said locking elements.

2. The system of claim 1 wherein said receiver body (1) is formed with a conical tool element receiving surface;
   and wherein said coupling element means includes means defining an engagement surface, fitting said conical tool receiving surface, said means defining said engagement surface and said retention stub forming a single unitary element.

3. The system of claim 1 wherein said receiver body (1) is formed with a conical tool element receiving surface;
   and wherein said coupling element means includes means defining an engagement surface, fitting said conical tool receiving surface, said means defining said engagement surface and said retention stub forming separable screw connected elements coaxial with said axis of rotation (2).

4. The system of claim 1 wherein said coupling element means (18) is formed by said retention stub (10a), which has an annularly encompassing groove (21) defined on one side by said conical surface region (21).

5. The system of claim 1 wherein said coupling element means (18) is mushroom-shaped.

6. The system of claim 1 wherein said receiving body (1) has a coaxial bore (4) for receiving a central clamping screw.

7. The system of claim 1 wherein said receiving body is formed with radial guide bores;
   and slides (27) radially displaceably supported in guide bores (26) of the wall of said receiving body (1) are provided as said coupling element means.

8. The system of claim 7 wherein each slide (27) is formed on its end face with at least one protruding chucking projection (31) having said locking surface (32).

9. The system of claim 8 wherein said chucking protrusion (31) is formed in the vicinity of its end face (34) to match the outline of said coupling element means (18; 10a).

10. The system of claim 7 wherein said actuating means have a turnbuckle-type screw (29) cooperating with corresponding threaded bores (28) of said diametrically opposed slides (27), said screw (29) having actuating devices (30) actuatable from outside and being located extending above said coupling element means (18; 10a).

11. The system of claim 1 wherein said coupling element means (18) is guided laterally in said receiving body (1).

* * * * *